United States Patent [19]
Hamilton et al.

[11] Patent Number: 5,393,964
[45] Date of Patent: Feb. 28, 1995

[54] TELECOMMUNICATIONS BOOTH AND METHOD OF USE

[75] Inventors: Robert H. Hamilton, Edina; Thomas J. Doyle, Minneapolis; Phillip R. Brooks, Eagan, all of Minn.

[73] Assignee: TPI, Inc., Minneapolis, Minn.

[21] Appl. No.: 243,533

[22] Filed: May 16, 1994

Related U.S. Application Data

[63] Continuation of Ser. No. 779,114, Oct. 15, 1991, abandoned, which is a continuation-in-part of Ser. No. 596,761, Oct. 12, 1990, abandoned.

[51] Int. Cl.$^6$ ............... G06F 7/08; H04M 11/00
[52] U.S. Cl. .................... 235/381; 379/91; 379/453; 902/35
[58] Field of Search ............ 235/375, 377, 379, 380, 235/381, 382; 312/7.2; 379/90, 91, 95, 96, 98, 100, 120, 132, 143, 144, 428, 437, 451, 453, 457; 902/24, 30, 31, 35

[56] References Cited

U.S. PATENT DOCUMENTS

| | | | |
|---|---|---|---|
| 3,233,346 | 2/1966 | Cornberg | 379/53 |
| 3,959,607 | 5/1976 | Vargo | 379/453 |
| 4,359,631 | 11/1982 | Lockwood et al. | 235/381 |
| 4,567,359 | 1/1986 | Lockwood | 235/381 |
| 4,812,629 | 3/1989 | O'Neil et al. | 235/383 |
| 4,845,636 | 7/1989 | Walker | 235/381 X |
| 4,900,905 | 2/1990 | Pusic | 235/382 |
| 4,902,881 | 2/1990 | Janku | 235/381 |
| 4,903,290 | 2/1990 | King | 379/52 |
| 5,008,927 | 4/1991 | Weiss et al. | 379/98 |
| 5,022,067 | 6/1991 | Hughes | 379/95 |
| 5,033,804 | 7/1991 | Faris | 312/208 |
| 5,193,110 | 3/1993 | Jones et al. | 379/100 X |
| 5,272,747 | 12/1993 | Meads | 379/144 X |

OTHER PUBLICATIONS

Ready Ref. Pressed & Welded, Inc., "The Industry Standard", Brochure, printed 1977, pp. 1–8.

*Primary Examiner*—David C. Nelms
*Assistant Examiner*—John R. Lee
*Attorney, Agent, or Firm*—Merchant, Gould, Smith, Edell, Welter & Schmidt

[57] ABSTRACT

A telecommunications booth providing business travelers a variety of services including telephone, facsimile, and various information options which result in automatic telephone dialing to desired destinations. The various telephonic devices function through a restrictor to access a single public communications channel. The restrictor prevents calls to certain classes of numbers, like 900 numbers. Billing data on the computer may be accessed through a modem.

10 Claims, 17 Drawing Sheets

AIRLINE RESERVATIONS

| | |
|---|---|
| ALASKA GOLD | LUFTHANSA |
| AMERICAN WEST | MIDWAY |
| AMERICAN | NORTHWEST |
| BRANIFF | PAN AM |
| CONTINENTAL | TIME AIR / CANADIAN PACIFIC |
| DELTA | TWA |
| EASTERN | UNITED |
| KLM ROYAL DUTCH | US AIR |

| MAIN MENU | PREVIOUS SCREEN | HELP | EXIT SUITE |

FIG. 5

FLIGHT INFORMATION

THE FLIGHT INFORMATION OPTION ALLOWS YOU TO ACCESS INFORMATION ABOUT FLIGHT SCHEDULE. YOU CAN SELECT FROM MAJOR U.S. CITIES FOR YOUR DEPARTURE AND DESTINATION LOCATIONS.

NOTE YOU CAN NOT USE THE PHONE WHILE USING THIS OPTION.

TOUCH TO PROCEED

| MAIN MENU | PREVIOUS SCREEN | HELP | EXIT SUITE |

FIG. 8

TOUCH DEPARTURE CITY

| ALBUQUERQUE | CINCINNATI | FT. LAUDERDALE | KANSAS CITY |
| ATLANTA | CLEVELAND | HARTFORD | LAS VEGAS |
| BALTIMORE | DALLAS | HONOLULU | LOS ANGELES |
| BOSTON | DAYTON | HOUSTON | MEMPHIS |
| CHARLOTTE | DENVER | INDIANAPOLIS | MIAMI |
| CHICAGO | DETROIT | KAHULUI | MINNEAPOLIS |

MORE SELECTIONS

| MAIN MENU | PREVIOUS SCREEN | HELP | EXIT SUITE |

FIG. 9

| TOUCH DESTINATION CITY | | | |
|---|---|---|---|
| ALBUQUERQUE | CINCINNATI | FT. LAUDERDALE | KANSAS CITY |
| ATLANTA | CLEVELAND | HARTFORD | LAS VEGAS |
| BALTIMORE | DALLAS | HONOLULU | LOS ANGELES |
| BOSTON | DAYTON | HOUSTON | MEMPHIS |
| CHARLOTTE | DENVER | INDIANAPOLIS | MIAMI |
| CHICAGO | DETROIT | KAHULUI | MINNEAPOLIS |

MORE SELECTIONS

| MAIN MENU | PREVIOUS SCREEN | HELP | EXIT SUITE |
|---|---|---|---|

FIG. 10

FAX MACHINE

— FACSIMILES CAN BE SENT OR RECEIVED.

— COPIES OF STANDARD WIDTH DOCUMENTS CAN BE MADE.

— THERE IS A MINIMUM SURCHARGE OF $3.95 FOR THE FIRST 30 SECONDS OF ACTUAL TRANSMISSION TIME AND AN ADDITIONAL CHARGE OF $3.95 PER MINUTE THERE AFTER.

— THE PHONE IS DISABLED DURING FAX USE.

TOUCH TO PROCEED

| MAIN MENU | PREVIOUS SCREEN | HELP | EXIT SUITE |

FIG. 11

TELECOMMUNICATIONS BOOTH AND METHOD OF USE

This is a continuation, of U.S. application Ser. No. 07/779,114, filed Oct. 15, 1991, (hereby expressly abandoned), which is a continuation-in-part of U.S. application Ser. No. 07/596,761, filed Oct. 12, 1990, (abandoned).

BACKGROUND OF THE INVENTION

1. Field of the Invention

The present invention relates to a telecommunications system for transmitting voice, data, and facsimile, all of which is housed in a booth. More particularly, the present invention relates to a fixed or portable office suite containing a telephone and facsimile machine that provides an enclosed, quiet work place for use by businessmen in airports and convention centers.

2. Background Information

Air travel and hotel living have become a fundamental regimen of business life. The growing group of businessmen and women who are required to travel are discriminating, time sensitive, and educated. They place high value on services and products that can minimize the disruption of travel to facilitate the conducting or completing of business while away from the office. Many services required by these business travelers are not conveniently accessible to them.

Some of the most important services that can be provided to a frequent business traveler while away from the office are those that are telecommunications related. Presently there exists a gap in telecommunications services available to business travelers at airports, hotels, and convention sites. Most travelers are currently restricted to the limited telecommunications services offered through pay phone facilities when waiting at airports or during breaks at convention centers and conferences.

Some airports offer or are pursuing business services through the "business center" concept. These centers usually offer secretarial, banking, facsimile, office, copy, and phone services. Although these centers have been successful, they have many disadvantages. Particularly, business centers are labor intensive in that a secretary and management staff are required, and billings for services are usually tracked and accumulated manually. Business centers are also usually inaccessible in that they are relegated to remote airport areas, and most airports which have them have limited the centers to one location. Business centers are furthermore time consuming. Due to their limited accessibility, a traveler must have sufficient time to locate a business center, conduct business, wait for accumulation of charges, and return to the airline gate.

The technology with respect to pay telephones is beginning to create products with enhanced features. For example, features may include credit card activation and automatic speed dialing. Compugram, Inc., offers a telephone with video display and facsimile add-on features. The Compugram phone requires a computer keyboard to conduct transactions. It is likely that such "smart" phones will replace at least a portion of existing coin-operated pay phones.

Other attempts at accommodating business travelers are disclosed in U.S. Pat. No. 3,959,607 and U.S. Pat. No. 4,902,881. U.S. Pat. No. 3,959,607 shows a climate-controlled booth having a chair and work table therein with a telephone on the table. Access to and exit from the booth is provided by an electronic credit card-operated lock system, controlled by a computer. The computer measures the time of use in the booth and the amount of telephone calls made and renders the user a monthly bill charged to his/her credit card. Although such a booth is of interest with respect to the present invention, it is essentially an upgraded phone booth and still does not address many of the capabilities and features sought by the business traveler.

U.S. Pat. No. 4,902,881 discloses a communications terminal offering simultaneous facsimile and telephone services through a host computer, with overall control based upon credit card billing. Document services include facsimile, copying, electronic mail, and document storage. Voice services include voice mail and telephone. The terminal requires a pair of public telephone channels. The terminal is configured in the form of a cabinet and, as such, is not very suitable for the business traveler. Furthermore, the multiple public telephone channels required points to the simultaneous activity of the various features and points away from locating such a unit in high travel traffic areas where public telephone channels are often limited.

All these various devices show motivation to satisfy telecommunications needs, none so compactly brings the many features desired by a business traveler together in the convenient configuration of the present invention.

SUMMARY OF THE INVENTION

The present invention is directed to a telecommunications booth which includes a housing with a telephone therein which is in communication with a public telecommunications channel via control mechanism. The control mechanism includes mechanism for restricting calls made from the telephone to certain first classes of telephone numbers, such as 900 numbers. The booth further includes mechanism for a user to enable the control mechanism. The user enabling mechanism includes mechanism for determining a time period during which the control mechanism is enabled and for determining user payment for that time period and also for user telephone calls to certain second classes of telephone numbers, like long distance numbers.

In another embodiment, the telecommunications booth is responsive to a user with a planar card having magnetic data disposed thereon. The booth includes a housing with a card reader supported by the housing such that the card reader reads the magnetic coated data and provides a first output signal. A preprogrammed computer system is also supported by the housing and includes mechanism for interacting with the user. The system is programmed to initiate an internal clock function and to enable the interacting mechanism on receiving the first output signal for the card reader. The system is also programmed to allow the user to disable the interacting means by interacting with the interacting means. The system further is programmed on disabling of the interacting means to automatically terminate the clock function and provide total time of use of the booth to the user. Both a telephone and a facsimile module are coupled to the computer system and are supported by the housing. A modem is also coupled to the computer system. Finally, the booth has mechanism for selectively providing communication between a public telecommunications channel and the telephone, the facsimile module, or the modem.

In still another embodiment, the present invention is embodied in a telecommunications train having a self propelled vehicle with a plurality of wheeled housings hitched thereto and to one another. Each of the housings is walled and has a door. Each of the housings further includes a telephone, mechanism for connecting to a public telecommunications channel, and control mechanism for communicating between the telephone and the connecting mechanism. Each of the housings further includes mechanism for a user to enable the control mechanism. The user enabling mechanism includes mechanism for determining a time period during which the control mechanism is enabled and for determining user payment.

The method of using the telecommunications booth of the present invention includes the steps of monitoring the card reader with the preprogrammed computer until a user appropriately presents a planar card having magnetic data disposed thereon. The magnetic data is read with the card reader and communicated to the computer to activate the computer for user interaction. The telephone is activated with a signal from the computer. A program in the computer is executed in response to input from the user who responds to an initial selection of information and telecommunications services displayed on the monitor which is in communication with the computer. One of the preprogrammed steps includes automatically dialing the telephone. The computer is deactivated for user interaction on appropriate input from the user which then also deactivates the telephone. At that time, a printer prints a billing statement based on the total activation time on the computer, the printer necessarily being in communication with the computer.

The various embodiments include various other features and the preprogramming includes various other steps providing services for the business traveler, all of which are discussed in more detail following a brief description of the drawings.

BRIEF DESCRIPTION OF THE DRAWINGS

FIG. 5 is a representation of the computer screen displayed after the user touched within the "Airline Reservations" icon of FIG. 4.

FIG. 8 is a representation of the computer screen displayed after the user touched within the "Flight Information" icon of FIG. 4.

FIG. 9 is a representation of the computer screen displayed after the user touched within the "TOUCH TO PROCEED" icon of FIG. 8.

FIG. 10 is a representation of the computer screen displayed after the user touched within the area of and affirmed the choice of the name of one of the cities on the screen of FIG. 9.

FIG. 11 is a representation of the computer screen displayed after the user touched within the "Fax Machine" icon of FIG. 4.

DETAILED DESCRIPTION OF THE PREFERRED EMBODIMENT

In the following Detailed Description of the Preferred Embodiment, reference is made to the accompanying Drawings which form a part hereof, and in which is shown by way of illustration a specific embodiment in which the invention may be practiced. It is to be understood that other embodiments may be utilized and structural changes may be made without departing from the scope of the present invention.

Figure 1:
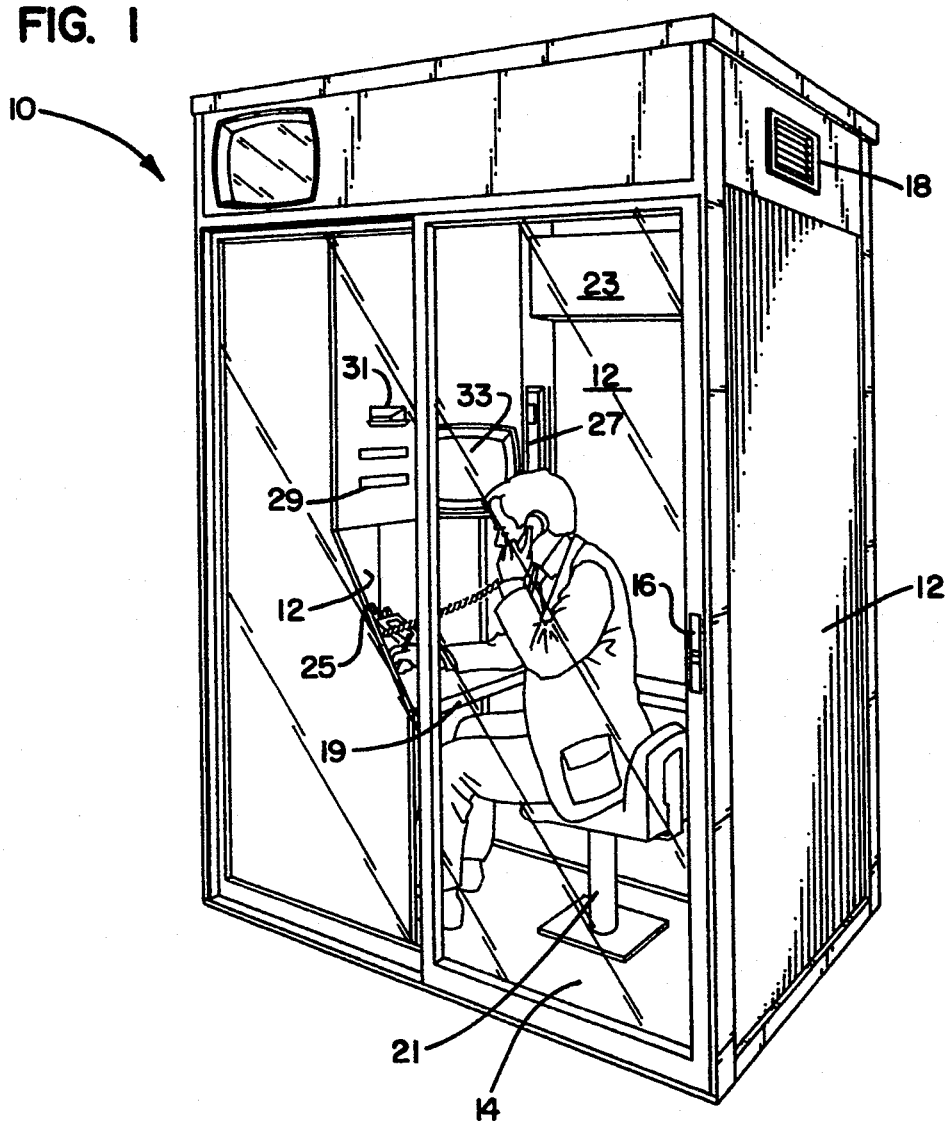
FIG. 1 is a perspective view of an office suite booth in accord with the present invention.

A telephone communications booth 10 is shown in FIG. 1. Booth 10 is a housing with a rectangular shape having walls 12, a floor 14, and a roof (not shown). One of the walls includes a sliding glass door 16. Ventilation is provided through a grate 18, or more preferably, by means of a fan or an air conditioner. A desk 19 is provided and may be simply a table surface. A chair 21 is located conveniently with respect to desk 19 and is preferably attached to floor 14. A light 23 is attached to at least one of walls 12.

The various electronics which provide the advantageous features of booth 10 may be located and supported by the structure in any of a variety of ways. In any case, with respect to FIG. 1, telephone 25 is located on desk 19. A cabinet is formed above desk 19 to hold and enclose much of the electronics. Card reader 27 is located on one side of the cabinet while facsimile 29 and printer 31 are located on the other side. Monitor 33 for the computer system is located between the card reader and the printer and facsimile. The particular location of these items, as indicated, is not important to the present invention and, consequently, the location of items not visible in FIG. 1 can be left to the discretion of one skilled in the art.

Figure 2:
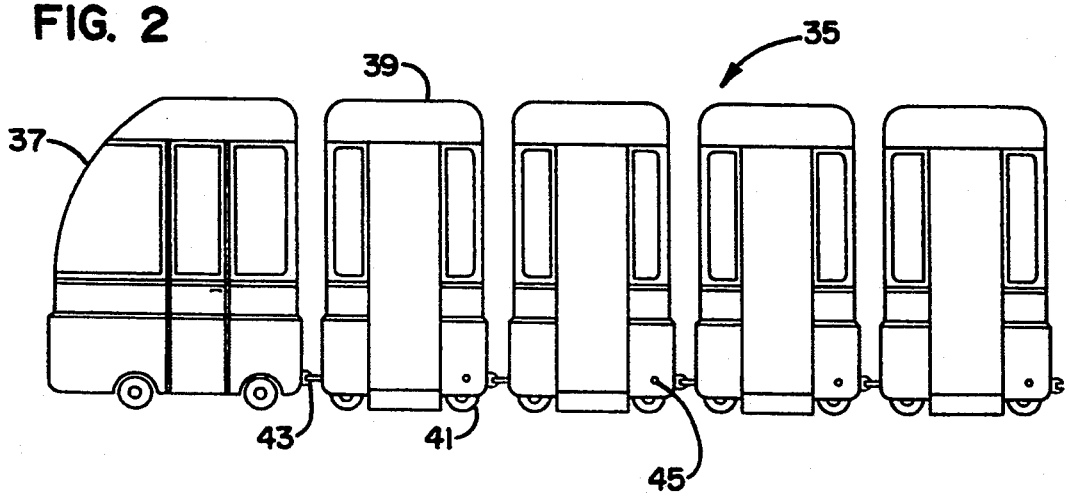
FIG. 2 is a perspective view of a series of said booths arranged to be easily transportable from location to location.

The present invention can alternatively be embodied on wheels and formed into a telecommunications train 35 as shown in FIG. 2. Train 35 includes a self-propelled, wheeled vehicle 37 and a plurality of housings 39. Each housing 39 is essentially a booth 10 with wheels 41 thereunder and forward and rearward hitches 43. A telephone jack 45 is provided in one of the walls of housing 39 for receiving a public telecommunications channel. Such connectors are well-known to those skilled.

Figure 3:
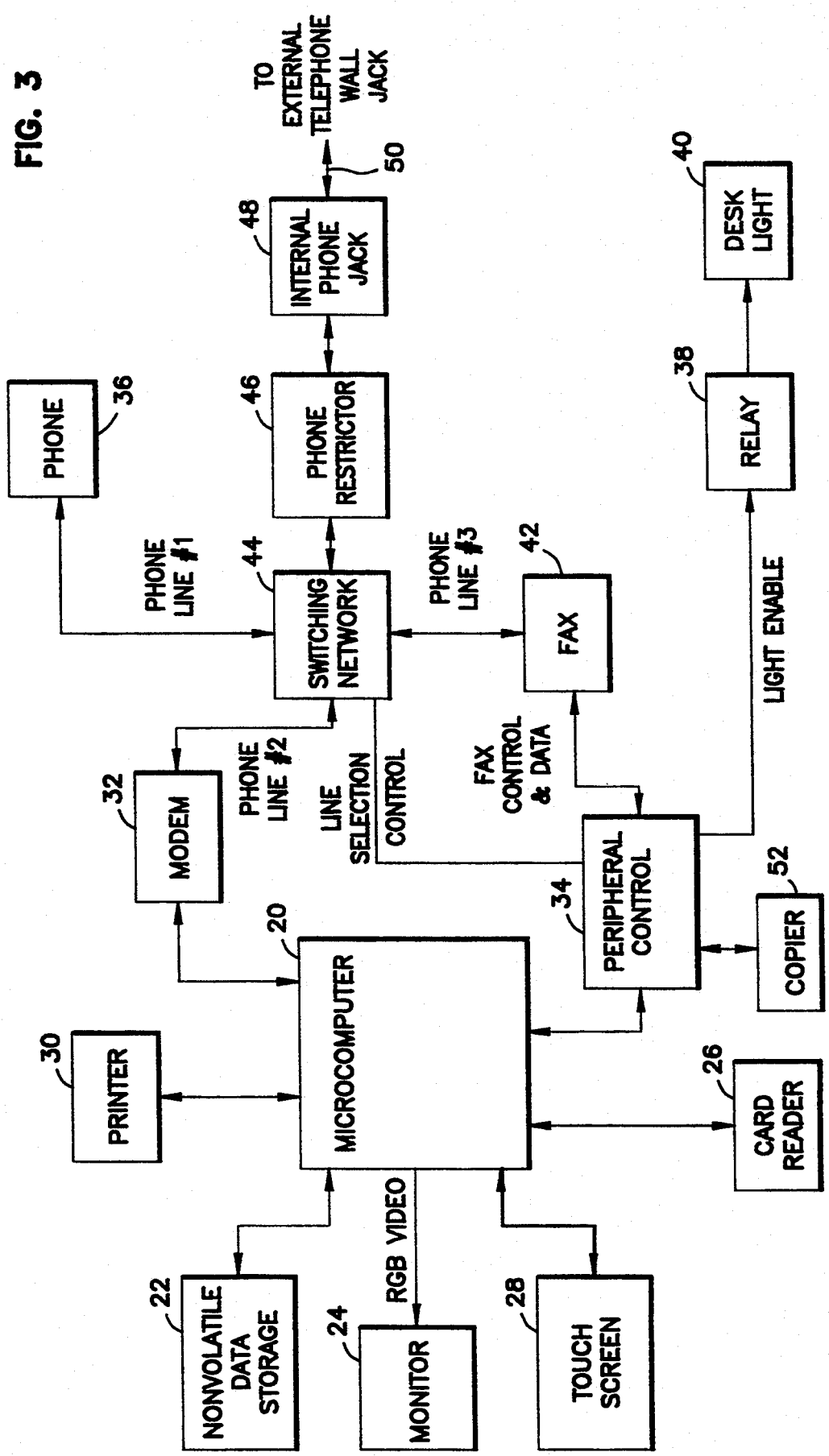
FIG. 3 is a block diagram representation of the electronics system for the booth of the present invention.

FIG. 3 shows an electrical block diagram of telephone communications booth 10 of FIG. 1. Computer 20 is a microprocessor based system connected to nonvolatile data storage device 22, RGB video monitor 24, touch screen interface 28, card reader 26, printer 30, modem 32 and peripheral control device 34. Representative computers 20 would be Amiga 500 Series and Amiga 2000 Series computers. A representative nonvolatile data storage device 22 for the Amiga 500 series computer would be a SupraDrive 30 MB Hard Drive connected to the Amiga computer over the internal data bus. Nonvolatile data storage device 22 for the Amiga 2000 Series computer would be the internal 50 MB hard drive which comes bundled with the 2000 Series computer.

Representative RGB video monitors 24 would be the CRT Display Model 1401B manufactured by RGB Display Corporation and the CRT Display Model 1084S manufactured by Commodore. Both monitors 24 are connected to computer 20 via a video line.

Representative touch screens 28 would be the thirteen inch diagonal Continuous Capacitive Touch Screen with touch controller manufactured by Interaction Systems and any of the number of fourteen inch touch screens manufactured by Elegraphics. These touch screens can be permanently attached to the face of the selected RGB color monitor and can be connected to computer 20 via an RS232 serial line.

A representative card reader 26 would be a MAGTEK 21055002 slotted magnetic card reader connected to computer 20 via an RS232 serial line. A representative printer 30 would be a Model DP-824 printer and controller manufactured by Star Micronics and connected through an RS232 serial line to computer 20. Representative modems 32 would be the external Supra Modem 2400 connected to computer 20 via an RS232 serial line and the internal Supra Modem 2400ZI connected to computer 20 via the internal data bus.

Interconnection of the electronics components is not discussed in greater detail since the interconnection of components in a microcomputer system is well known in the prior art. It is understood that other interconnect arrangements and other equipment could be substituted without departing from the scope of the invention.

Peripheral control device 34 is connected to facsimile machine 42 (representative facsimile machines would be the Harris/3M Model 111 FAX and the Murata Model F55), copier 52, telephone switching network 44 and, via relay 38, to light 40. Peripheral control device 34 is a registered interface circuit that receives commands from computer 20 and transmits status back to computer 20. A subset of the command lines are forwarded to facsimile machine 42. A second subset of the command lines are forwarded to copier 52. The remainder of the lines provides control lines to control light 40 or to configure switching network 44. Status from facsimile machine 42 and copier 52 is returned to computer 20 via peripheral control device 34.

Switching network 44 is used to connect one of either modem 32, facsimile machine 42 or telephone 36 to the public telecommunications channel 50 under control of computer 20. Again, the use of a switching network to provide access of more than one telephonic device to a public telecommunications channel is not presented in greater detail as it is well known in the prior art.

Telephone restrictor 46 is connected between internal telephone jack 48 and switching network 44 to capture and disable calls to restricted numbers. Telephone restrictor 46 operates by monitoring the DMTF tone generated by a telephone and ending the call when a restricted sequence of tones (i.e. a restricted telephone number) is detected. This is necessary because, in one preferred embodiment, domestic telephone charges are free of charge. The charge will only be based on the length of the suite session. Therefore precautions must be taken to prevent access to more costly services (like 900 numbers). Internal telephone jack 48 provides a modular connection between telephone restrictor 46 and public telecommunications channel 50. Jack 48 is compatible with a standard domestic telephone cable. Telephone restrictor 46 is an off-the-shelf component well known in the prior art.

Figure 14:
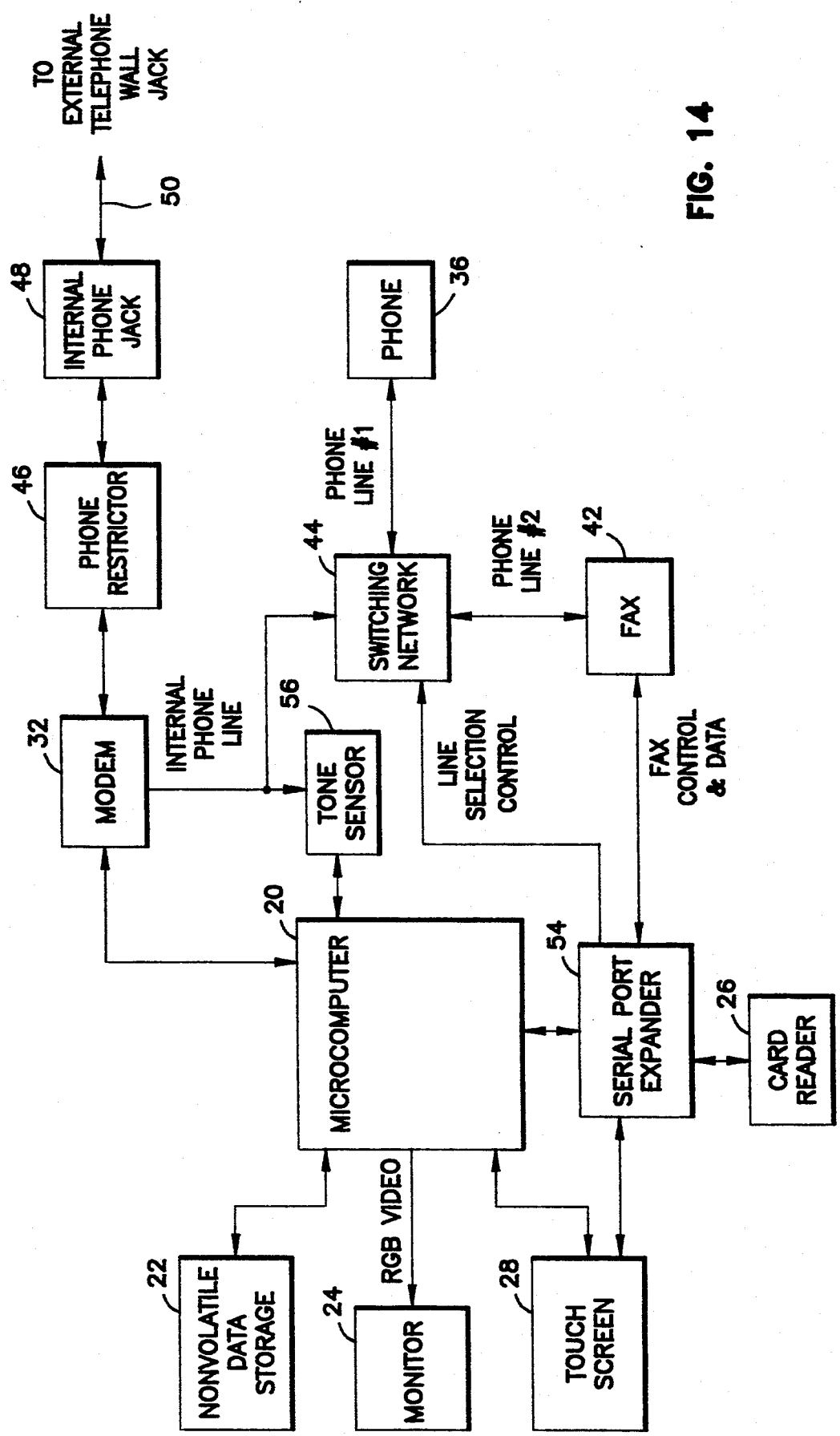
FIG. 14 is a block diagram representation of a second embodiment of the electronics system for the booth of the present invention.

A second embodiment of the electronics of telephone communications booth 10 is shown in the electrical block diagram of FIG. 14. In this embodiment, computer 20 is connected to nonvolatile data storage device 22, RGB video monitor 24, modem 32 and serial port expander 54. Modem 32 is also connected through phone restrictor 46 and phone jack 48 to public telecommunications channel 50 and through switching network 44 to telephone 36 and facsimile machine 42. Serial port expander 54 provides a serial interface to touch screen interface 28, card reader 26, switching network 44 and facsimile machine 42. An optional tone sensor 56 can be installed to capture tone codes generated by telephone 36 or facsimile machine 42 in order to monitor the destination of the call. This function can be used advantageously to charge for telecommunications usage depending on the destination called.

In the embodiment shown in FIG. 14, the printing function performed by printer 30 and the copying function performed by copier 52, both shown in FIG. 3, are performed by facsimile machine 42. In this embodiment, facsimile 42 is a Murata F55 facsimile machine. This model comes with internal memory which can be used to store the contents of documents that have been received or will be sent by machine 42. The internal memory is useful for using facsimile machine 42 as a printer or a copier. For printing, an ASCII file is created in computer 20 and downloaded through serial port expander 54 to the internal memory of facsimile machine 42. A control code is then passed to facsimile machine 42 to cause it to print the document contained in the file. For copying, a document is fed into machine 42 and scanned (just as in sending a facsimile). The scanned document's contents are stored in the internal memory of machine 42 and printed upon receipt of the appropriate control code from computer 20. The use of machine 42 as a copier and a printer significantly reduces the number and cost of components in the system and increases reliability.

Operation of telecommunications booth 10 will be described in connection with the first embodiment shown in FIG. 3. On receiving power, computer 20 reads up its programming from nonvolatile data storage device 22 and begins executing a diagnostic program. On successful completion of the program, computer 20 begins displaying a predetermined sequence of display screens on video monitor 24 and waits for activation.

The system is activated by passing a planar card having magnetic data disposed thereon through card reader 26. Card reader 26 then transmits data corresponding to the magnetic data imprinted on the planar card to computer 20. Computer 20 in turn stores the data to nonvolatile data storage device 22 and activates the suite. Activation consists of writing to peripheral control 34 to close relay 38 (which turns on desk light 40), writing to peripheral control 34 to set up switching network 44 to connect telephone 36 to the external telephone line, and displaying the main menu on video monitor 24.

In the preferred embodiment, computer 20 displays choices available to the user as a series of icons displayed on video monitor 24. The user makes selections by contacting touch screen 28 with a finger in the vicinity of the desired icon. On a contact coincident with an icon location, computer 20 begins to execute the program associated with the selected icon. This leads to the display of a new series of screen displays and the presentation of new choices to the user. [NOTE: Care must be taken to calibrate the alignment of icons displayed on video 24 to the alignment of touch screen 28 on the monitor in order to ensure proper operation.]

Figure 4:
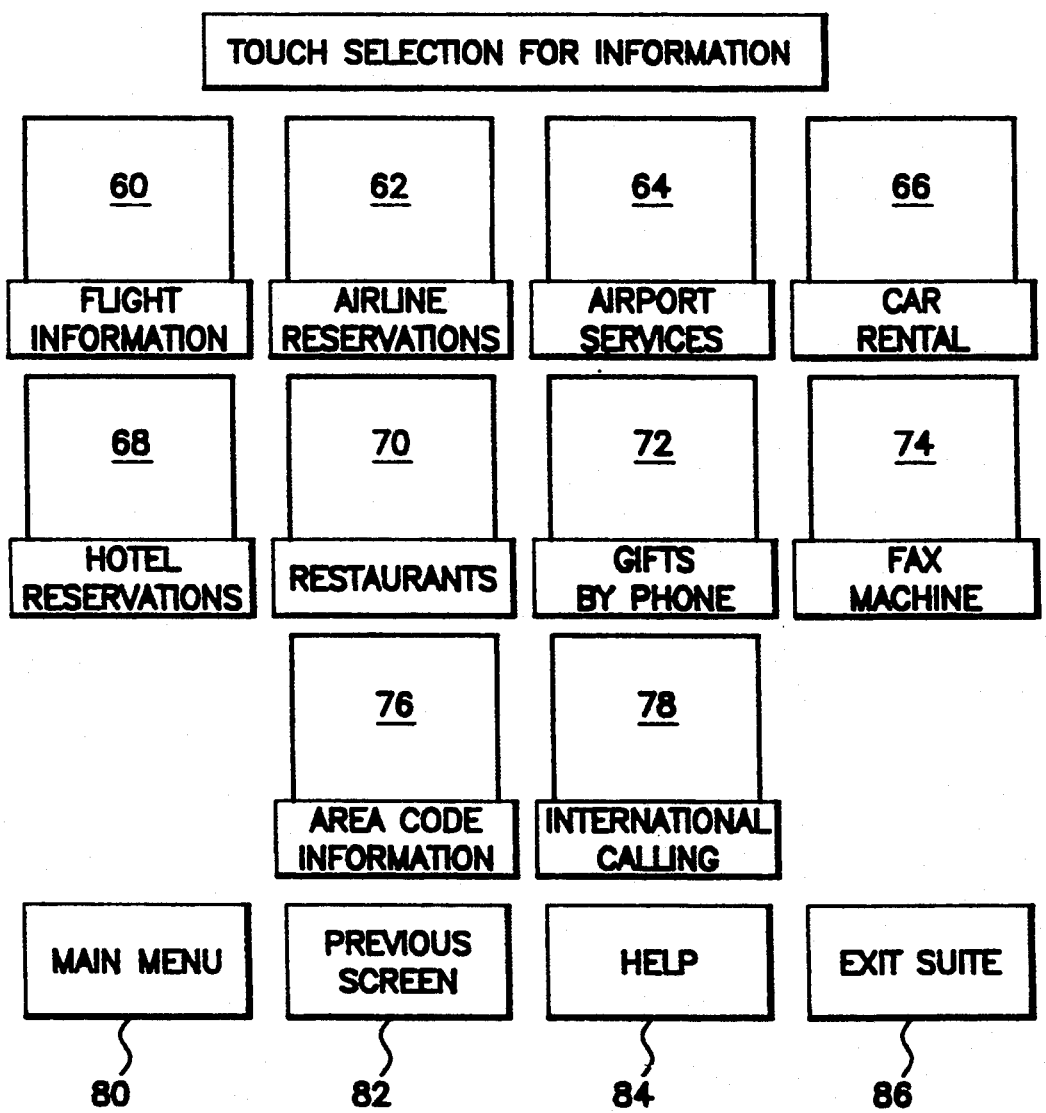
FIG. 4 is a representation of a computer screen display of a typical main menu.

A representative main menu screen display is illustrated in FIG. 4. Icons that can be selected include flight information 60, airline reservations 62, airport services 64, car rental reservations 66, hotel reservations 68, restaurant information and reservations 70, information on specialty shops 72, facsimile machine access 74, area code information 76, and international operator access 78. Selection of an icon causes the display of a screen size version of the icon and then the display of the choices available for that particular service.

Control icons line the bottom of FIG. 4. The control icons are "MAIN MENU" 80, "PREVIOUS SCREEN" 82, "HELP" 84 and "EXIT SUITE" 86. These icons are at the base of every computer screen display and perform standard tasks. "MAIN MENU" 80 always take the program back to the main menu screen. "PREVIOUS SCREEN" 82 displays the previous screen. "HELP" 84 displays the help screen pertinent to the service being offered or a general help screen if touched at the main menu. "EXIT SUITE" 86 causes the computer to store its place in the program and ask if the user really wants to leave. If the answer is affirmative, the computer displays the billing screen display and deactivates the suite. If the answer is negative, the computer returns the user to the service in which the "EXIT SUITE" icon 86 was touched.

Figure 13A:
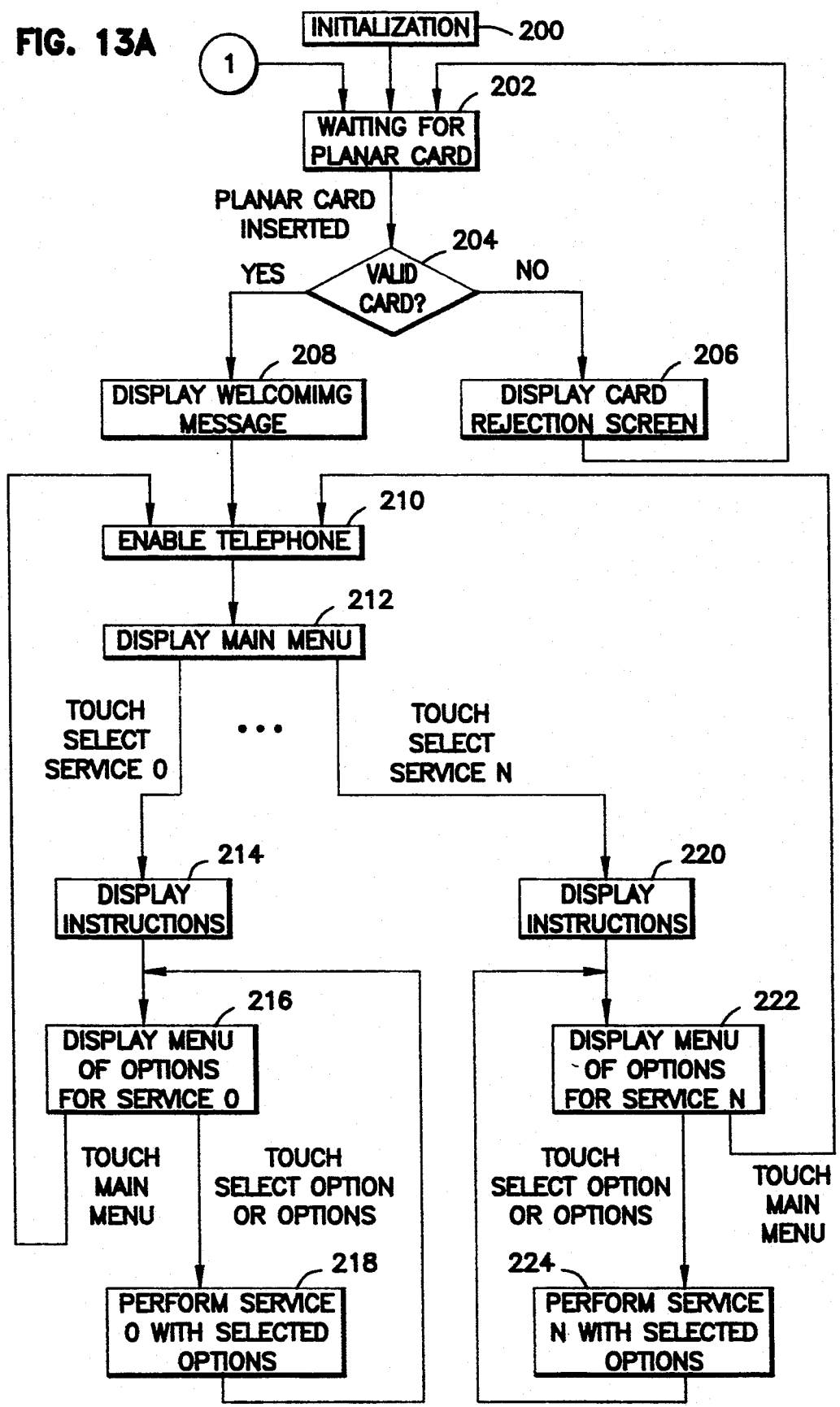
FIGS. 13a and 13b are flow chart representations of the control program executed while a customer is selecting a service according to the present invention.
Figure 13B:
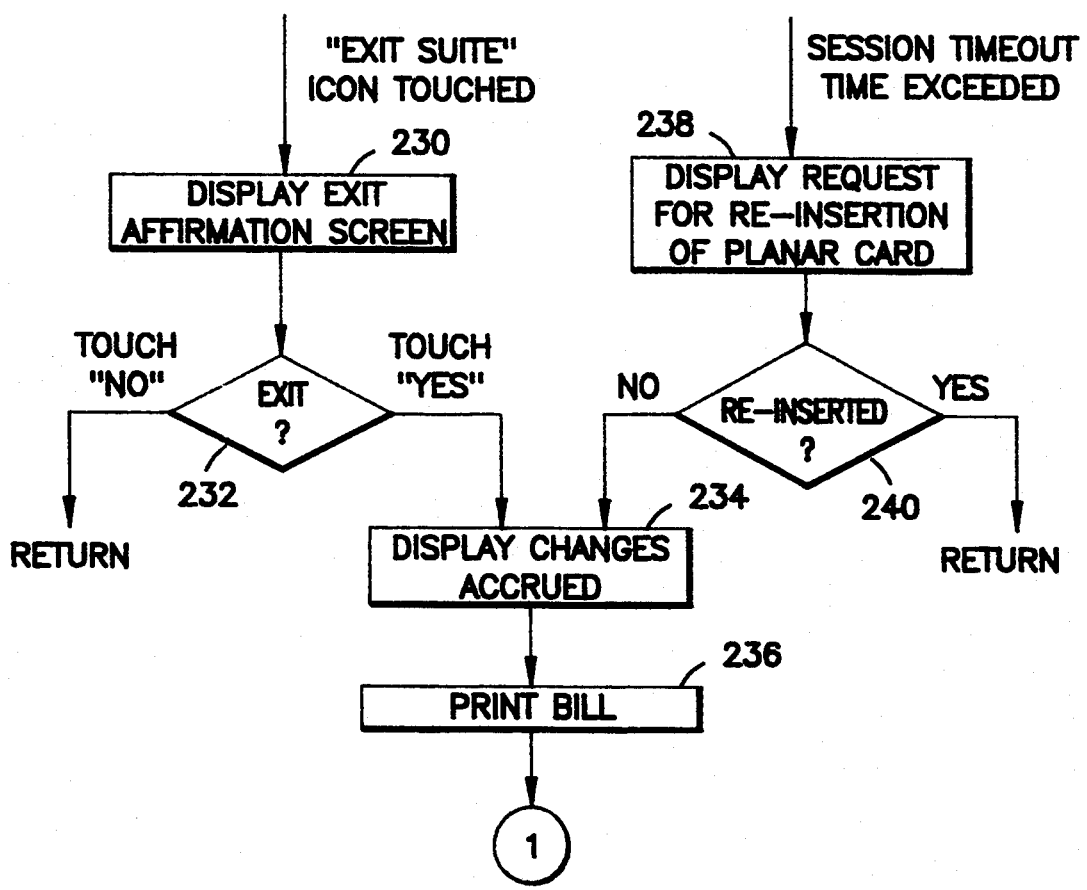

FIGS. 13a and 13b describe a representative control flow program for computer 20 in the present invention. The routine is entered at 200 upon initialization of computer 20. Execution of the initialization routine includes initialization of peripheral devices and the execution of selected diagnostics routines. Upon the end of the initialization routine, control moves to 202 where computer 20 monitors card reader 26 for the presence of a planar card having magnetic data disposed thereon. Upon detection of such a planar card, a check of validity is performed at 204. If the card is not valid, computer 20 displays a card rejection screen at 206 and returns to 202 to wait for insertion of a card.

If the card is valid, a welcoming message is displayed at 208, telephone 36 is connected via switching network 44 to public telecommunications channel 50 at 210, and a main menu of service selections is displayed at 212. (The program is sent to 210 when icon "MAIN MENU" 80 of FIG. 4 is touched in any menu screen.) Touch selections may be made at 212. The number of touch selections is limited only by the touch screens ability of distinguishing touch locations. A selection at 212 of service 0 takes the program to 214 where instructions for that service are displayed and then to 216 where a menu of further options is displayed. Once all the options are selected, service 0 is executed at 218. At the end of service 0 the program returns to 216. There service 0 can be repeated or selection of "MAIN MENU" will return the program to 210. A selection of service N at 212 takes the program through 220, 222, and 224 in a similar manner.

FIG. 13b illustrates two exception handling routines. The selection of icon "EXIT SUITE" 86 is handled as an exception because of the necessity to recover from inadvertent touching of that icon. As can be seen in FIG. 13b, on selection of "EXIT SUITE" 86 computer 20 displays an exit affirmation screen at 230 and monitors for a touch. If the touch is within the "NO" icon, the program at 232 returns to the program location from which "EXIT SUITE" icon 86 was selected. If the touch is within the "YES" icon, the program at 232 proceeds to 234 where computer 20 displays the accrued charges for that session, to 236 where a bill is printed by printer 30 and then to 202.

At predetermined intervals during the suite session, the user will be prompted by monitor 24 and a beeping sound from computer 20 to re-insert their magnetized planar card. This is intended to prevent the use of the booth by others in the event that the user forgets to exit the suite properly. Computer 20 will maintain an independent software timer. When this timer "times out" after the predetermined time period, an exception occurs and computer 20 displays a request for reinsertion of the card at 238. If the card is not re-inserted within a second predetermined time period the program at 240 proceeds to 234 where computer 20 displays the accrued charges for that session, to 236 where a bill is printed by printer 30 and then to 202.

Figure 6:
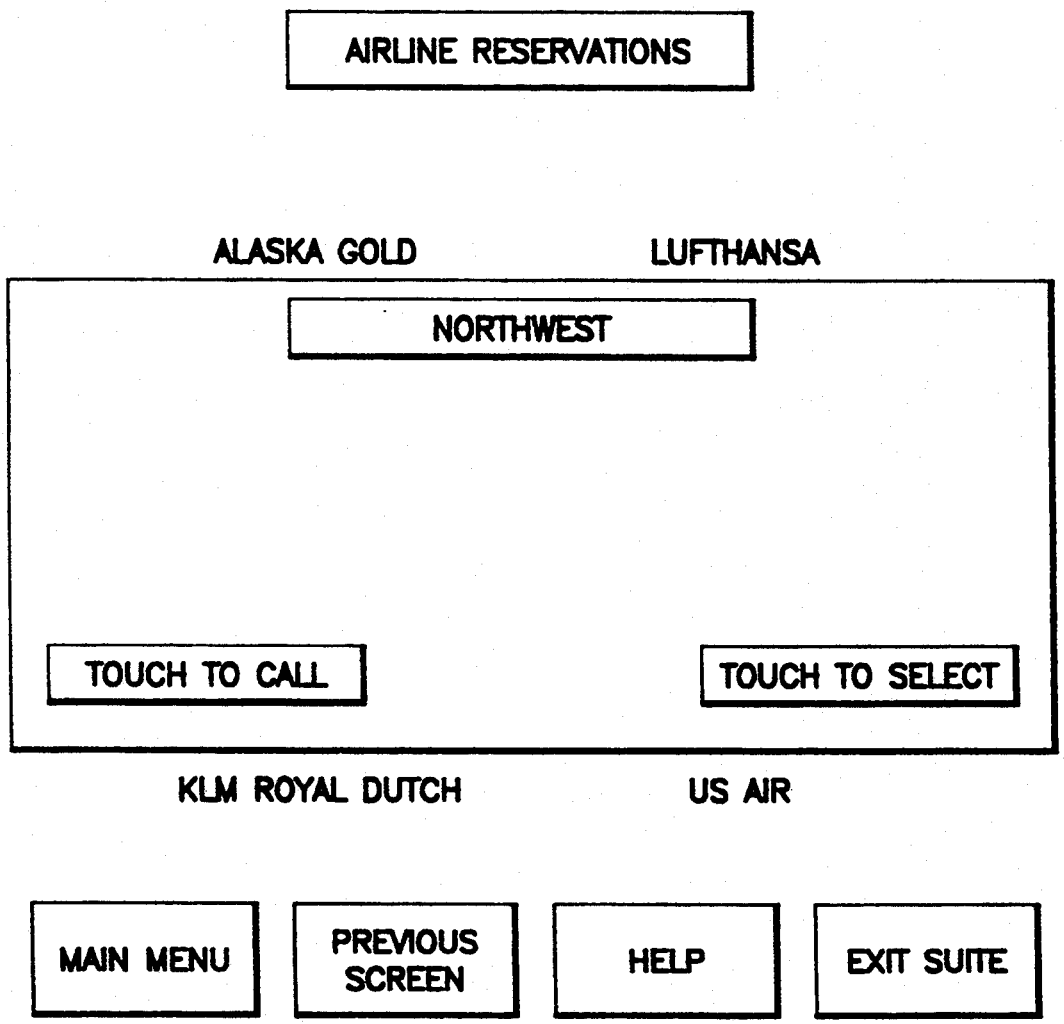
FIG. 6 is a representation of the computer screen displayed after the user touched within the area of the word "Northwest" on the screen of FIG. 4.
Figure 7:
FIG. 7 is a representation of the computer screen displayed after the user touched within the "TOUCH TO CALL" icon of FIG. 5.

FIG. 5 illustrates the result of touching the "Airline Reservations" icon shown in FIG. 4. The screen of FIG. 5 lists a number of airlines. Touching in the area of the name of one of these airlines will cause the selection of that airline and its display within a box in a screen display like that of FIG. 6. FIG. 6 shows the result of the selection of "NORTHWEST" in the screen of FIG. 5. FIG. 6 also displays two new icons: "TOUCH TO CALL" and "TOUCH TO RESELECT". Touch screen contact within the area of "TOUCH TO RESELECT" causes the computer to go back to displaying the screen of FIG. 5 and wait for a new selection. Touch screen contact within the area of "TOUCH TO CALL" causes the computer to display a screen like that shown in FIG. 7. The user can then pick up the telephone receiver and the computer will automatically dial the reservation number of the selected airline. On completion of dialing the screen returns to that of FIG. 5.

Figure 15:
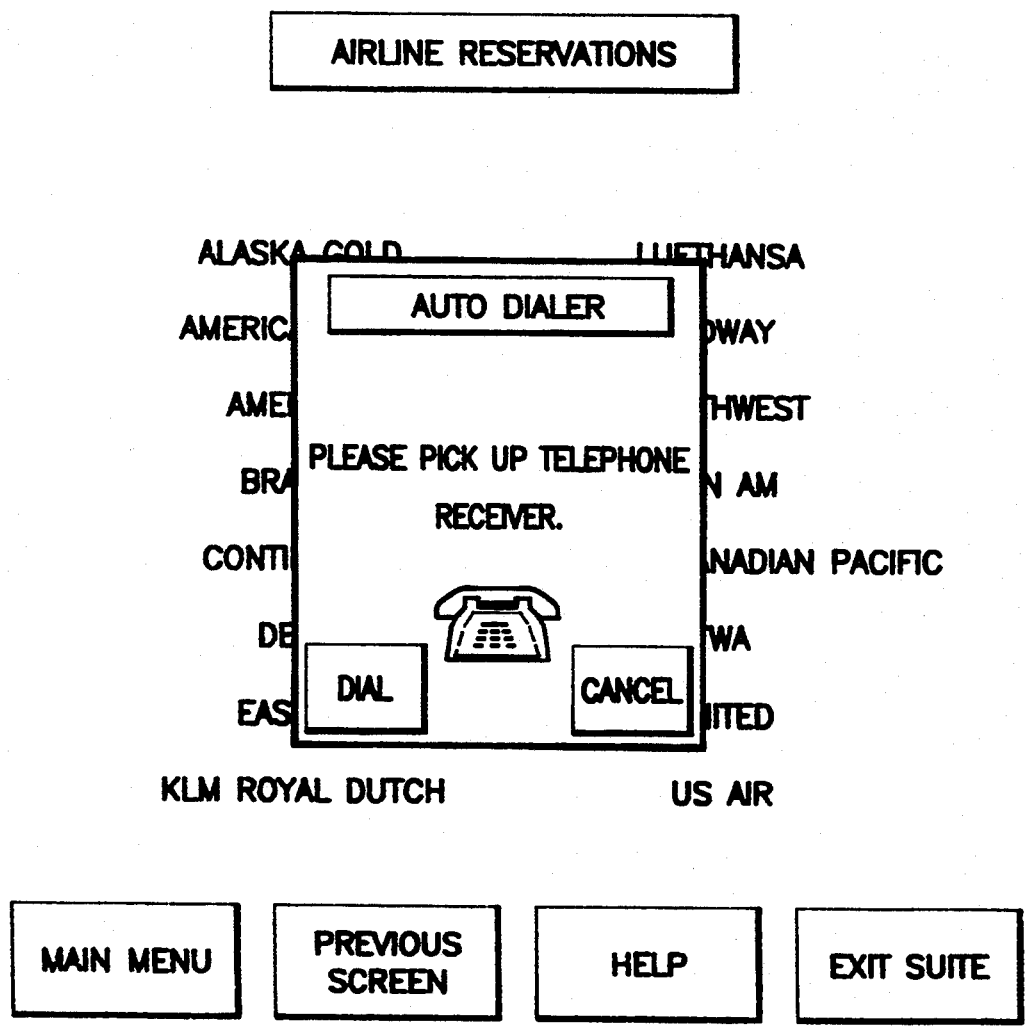
FIG. 15 is an alternate embodiment of the computer screen displayed after the user touched within the "TOUCH TO CALL" icon of FIG. 5.

In the alternate embodiment shown in FIG. 15, the box superimposed over the list of airlines contains two touch locations. Touching the box labelled "DIAL" causes computer 20 to dial the number of desired airline reservation desk. "CANCEL" removes the box and allows the user to select another airline. This embodiment is advantageous for use with electronics which cannot sense the receiver being lifted off of the hook.

A similar sequence of selection displays allows the user to select and make reservations at restaurants within specified cities "touch "Restaurants" 70 at the main menu), at hotels ("Hotel Reservations" 68), and at car rental counters ("Car Rental" 66). Selecting "Gifts By Phones" activates a program that provides the names of a series of specialty shops and automatically dials the telephone number of the selected shop.

FIG. 8 illustrates the result of touching the "Flight Information" icon shown in FIG. 4. The flight information service is an aid for planning flights. It is connected via modem 32 to a flight information service. The screen of FIG. 8 lists directions for using the flight information service, the four control icons and the icon "TOUCH TO PROCEED". Touching in the area of the "TOUCH TO PROCEED" icon causes the computer to display the screen shown in FIG. 9. The screen of FIG. 9 lists a number of departure cities. Selection of the "MORE SELECTIONS" icon will cause the display of the next group of cities. Selection of a city from the group of departure cities will cause the computer to ask for affirmation as to the city selected and then, on receiving affirmation, to list a number of destination cities as in FIG. 10. Similar displays allow the selection of time of departure and date of departure. When city of departure, city of destination, and time and date of departure have been selected, computer 20 queries the flight information service via modem 32 for flights fitting that description within a predetermined time window around the time of departure. The resulting flights are listed on the computer screen and can be printed to printer 30. The user can then select "Airline Reservations" and the computer will start the airline reservations program and display the screen of FIG. 5.

Figure 16:
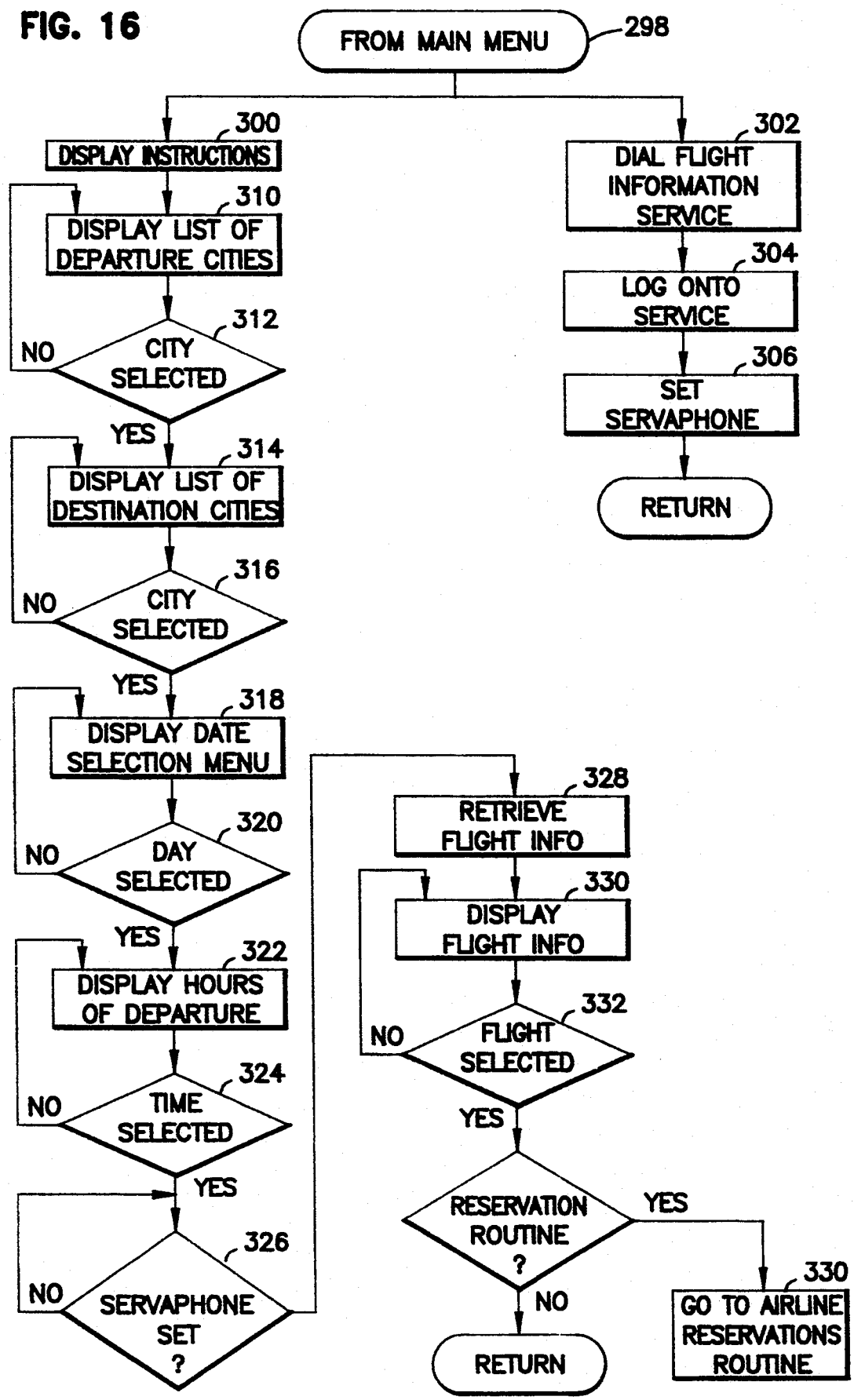
FIG. 16 is a flow chart representation of the control program executed while a customer is acquiring flight information according to the present invention.

A more detailed description of the sequence of steps taken in acquiring flight information is provided in connection with the flowchart shown in FIG. 16. FIG. 16 illustrates an embodiment of the steps taken by computer 20 after selection of the "Flight Information" icon shown in FIG. 4. The program is entered at 298 where computer 20 sets up two independent tasks to be executed in acquiring the desired flight information. This takes advantage of the multi-tasking capability of the Amiga series computers to reduce the apparent wait for access to flight information.

The first task executed is to log onto the flight information service. Control in this task moves to 302 where the telephone number of the service is dialed. A representative flight information service company is Official Airline Guide operating from Chicago, IL.

Once a connection is made, control moves to 304 where computer 20 "logs on" to the service. Control then moves to 306 where a semaphore is set in memory. The task is then terminated.

The embodiments shown in this application use a semaphore mechanism in which a location in memory is kept for communication between the tasks. The above described task can write to the semaphore. The next task can only read the semaphore. This prevents a lock-up problem.

The second task executed is that dealing with the user interface. Control in that task moves to 300 where the screen of FIG. 8 is displayed. Control then moves (as described above) to 310 where a list of departure cities is displayed (as in FIG. 9) and to 312 where a check is made to determine if a departure city has been selected. If not, control moves back to 310.

If a departure city has been selected, control moves to 314 where a list of destination cities is displayed as shown in FIG. 10. Control then moves to 316 where a check is made to determine if a destination city has been selected. Of not, control moves back to 314.

If a destination city has been selected, control moves to 318 to allow selection of the date of departure and through 320 to 322 to allow selection of the time of departure. Once date and time have been selected, control moves to 326 where a check is made to determine if the semaphore flag associated with the first task is set. If not, control remains at 326 until the semaphore flag is set.

If the check at 326 indicates the semaphore flag is set, communication with the appropriate flight information service company has been established. Control moves to 328 where computer 20 queries the service for flights near the desired flight time. The resulting flights are displayed at 330 and the customer can select the desired flight.

Once the desired flight has been selected (or determined at 332) control moves to 334 where the user is given the option of proceeding to the "Airline Reservations" routine. If not, control returns to the main program.

In an alternate embodiment, a file containing current flight information could be maintained in nonvolatile data storage device 22. The file could be updated periodically from a remote location by establishing communication with computer 20.

Figure 12:
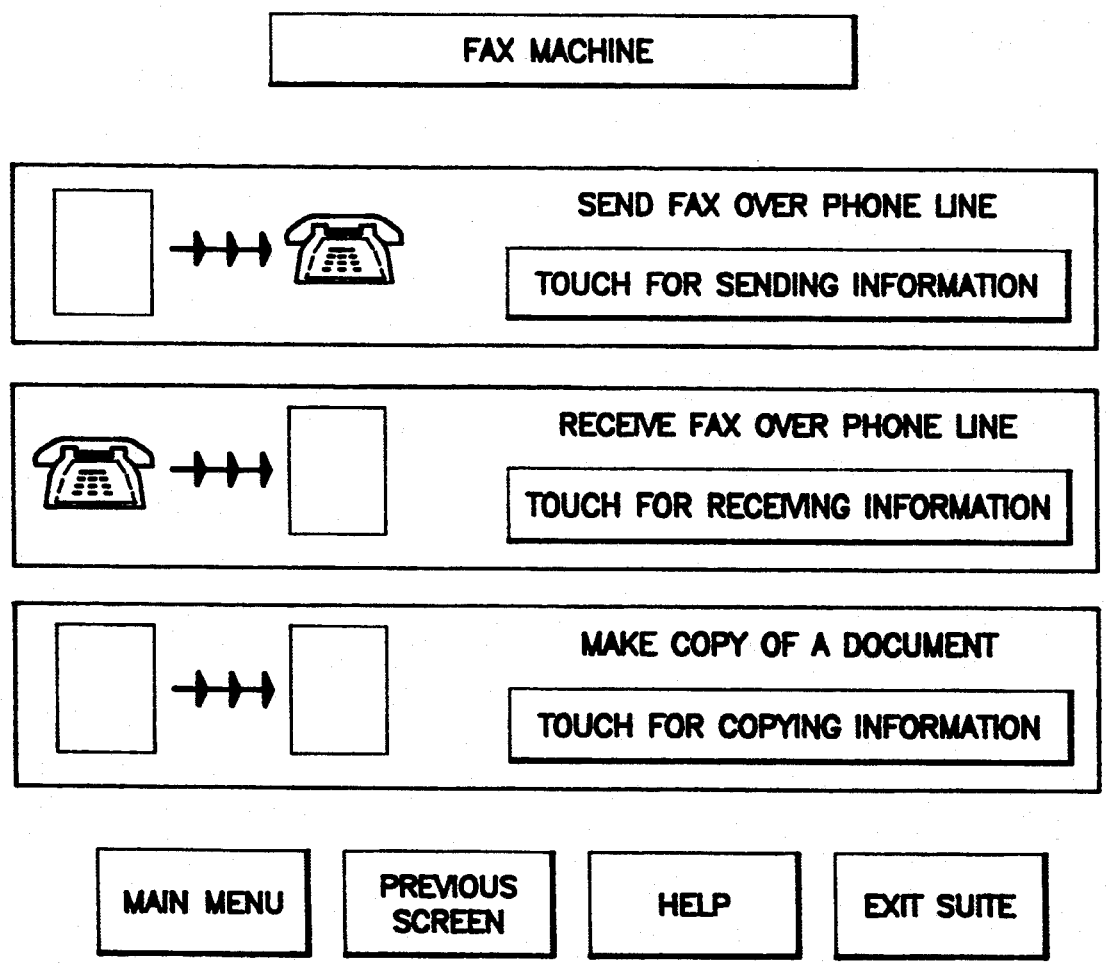
FIG. 12 is a representation of the computer screen displayed after the user touched within the "TOUCH TO PROCEED" icon of FIG. 11.

FIG. 11 illustrates the result of touching the "Fax Machine" icon shown in FIG. 4. Selection of that icon activates facsimile machine 42. The screen of FIG. 11 lists directions for using facsimile machine 42, the charges involved, the four control icons and the icon "TOUCH TO PROCEED". Touching in the area of the "TOUCH TO PROCEED" icon causes the computer to display the screen shown in FIG. 12. The screen of FIG. 12 lists the three services available via facsimile machine 42. Selecting the icon labelled "TOUCH FOR SENDING INFORMATION" causes the transmission of papers placed into the input tray of facsimile machine 42 to the entered telephone number. Selecting the icon labelled "TOUCH FOR RECEIVING INFORMATION" causes facsimile machine 42 to wait for the transmission of facsimile data from a remote telephone location. Selecting the icon labelled "TOUCH FOR COPYING INFORMATION" causes facsimile machine 42 to transmit to itself. The result of a copy of the papers that were placed into the input tray of facsimile machine 42.

In an alternate embodiment selecting the "TOUCH FOR COPYING INFORMATION" icon would activate copier 52 to copy a document.

Selecting "Area Code Information" activates a program that provides a map displaying area codes and automatically deals information within a selected area code. Selecting "Airport Services" activates a program that provides a map of the airport and marks the location of selected services within the airport. Selecting "International Calling" causes the computer to automatically dial an international operator. In one preferred embodiment, an additional charge is added for each minute the suite is accessing international telecommunications channels.

Figure 17:
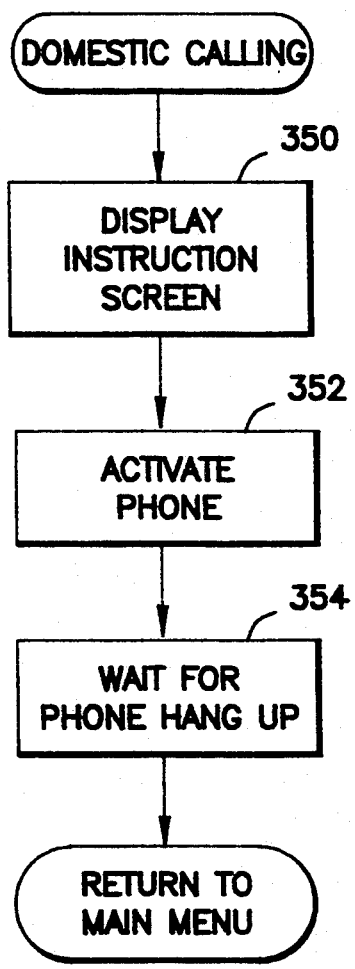
FIG. 17 is a flow chart representation of the control program executed in placing an international telephone call according to the present invention.

The program associated with the selection of "International Calling" is described in connection with FIG. 17. FIG. 17 is a flowchart indicative of the steps taken by computer 20 in executing an international telephone call.

The routine is entered at 350 where an instruction screen is displayed. Once the user verifies that an international call is intended control moves to 352. At 352, computer 20 issues a control code via modem 32 to telephone restrictor 46 which tells restrictor 46 to permit the next call to pass through unrestricted. At the same time, computer 20 begins a timer to measure the length of time international service is being accessed. Time is measured from the issuance of the code to restrictor 46 until the user signals termination of the call by touching the appropriate box on the touch screen 28.

When the termination signal is received by computer 20, computer 20 momentarily takes the phone line to the "Hang Up" position to terminate the call.

In one alternate embodiment, computer 20 could be used to charge destination weighted toll charges by requiring the user to enter the telephone number on touch screen 28. Computer 20 would then dial all telephone numbers.

In another alternate embodiment, a tone sensor 56 (as shown in FIG. 14) could be used to monitor the DMTF tones generated by telephone 36, modem 32 or facsimile machine 42. The captured tones could then be used to decipher the destination in order to change destination-weighted telephone tolls.

In another embodiment, any of the above methods could be used to monitor domestic telephone calls.

In the preferred embodiment, computer 20 is programmed to log activity within the suite. Activity to be logged includes the results of diagnostics, total suite usage, service selected, and the frequency of access of each service. This information is accessible by calling from a remote location, establishing a link between the remote computer and computer 20 via modems, and requesting an upload of the log to date.

To use the present invention, the user enters the booth and inserts a credit card into the card reader. The computer verifies the data on the credit card for proper number length, format, and expiration date. If the card is acceptable, the computer creates a transaction number, records the time, activates the telephone and displays a menu of the available services.

The user has unlimited use of the telephone for most domestic calls. (Calls to area code 900 numbers and domestic operator-assisted calls are not permitted.) Calls to international numbers directed through a international operator are permitted but a higher suite charge is incurred during these calls.

Once the suite is activated, the user can access a variety of services as displayed on the main menu. If the user selects "Airline Reservations", a list of airlines will be displayed and, upon the selection of an airline, the computer will automatically dial the telephone number of the reservation desk at the selected airline. If the user selects "Restaurants", a list of cities covered will be displayed. The user can select a city and then the computer will list respected restaurants in the selected city. If the user selects a restaurant, the computer will automatically dial the restaurant. The user has access to similar services for car rental, hotels, directory information and specialty shops.

If the user selects "Fax Machine", the system will switch power to the facsimile machine, create a transaction, and display a menu of facsimile machine options. The user can send or receive facsimiles or copy documents. A charge is incurred for activating the facsimile machine. An additional charge is incurred for the time that the facsimile machine is sending or receiving facsimiles.

If the user selects "Flight Information", the system initiates a modem call to an on-line airline flight information service. The user can select departure and destination city, time of departure and date of departure and the system will query the on-line information service for the latest information on flights available within a predetermined time window around the selected time. The results are then displayed and can be printed if desired.

To end the session the user touches the "EXIT SUITE" icon present at the bottom of every menu screen. The system will then display the charges accrued for the session and print an itemized listing of the charges for the user's records. The listing will include the date and time of the start of the transaction, the total charges and a breakdown of the charges into usage time, charge rate, and charge for use of the suite, the facsimile machine, and the telephone for international calls.

Although the present invention has been described with reference to the preferred embodiments, those skilled in the art will recognize that changes may be made in form and detail without departing from the spirit and scope of the invention.

We claim:

1. A telecommunications booth responsive to a user with a planar card having data disposed thereon, comprising:
   a housing;
   a card reader supported by said housing for reading the data on said card;
   a preprogrammed computer system supported by said housing and including program means for interacting with said user;
   a telephone coupled to said computer system and supported by said housing;
   a facsimile module coupled to said computer system and supported by said housing;
   a modem coupled to said computer system;
   a public telecommunications channel; and
   means for selectively providing communication between said public telecommunications channel and one of said telephone, said facsimile module, and said modem;
   said communication providing means including means for switching connection with said public telecommunications channel to one of said telephone, said facsimile module, and said modem;
   said communication providing means further including means for controlling said switching means through said computer system based on interaction between said user and said program means.

2. The booth in accordance with claim 1 wherein said interacting means includes a monitor supported by said housing and in communication with said computer system, said interacting means further including a touch screen interface attached to said monitor, said program means further including means for accepting input information from said touch screen interface and modifying programming execution accordingly.

3. The booth in accordance with claim 1 also including a printer supported by said housing and in communication with said computer system, said program means also including means for causing said printer to print a bill based on total time of booth use.

4. The booth in accordance with claim 1 wherein said housing includes a walled enclosure with a door, said walled enclosure including attached thereto a desk and a chair, said walled enclosure further including a light.

5. The booth in accordance with claim 4 including wheels operably attached to said housing.

6. A method of using a telecommunications booth wherein access thereto is controlled, comprising the steps of:

monitoring a card reader with a preprogrammed computer until a user appropriately presents a planar card having magnetic data disposed thereon;

reading said magnetic data with said card reader and communicating same to said computer to activate said computer for user interaction;

executing a main program in response to input from said user who is responding to a selection of information and telecommunications services displayed on a monitor in communication with said computer and, based on interaction between said user and said main program, controlling switching means with said computer to provide communication between a public telecommunications channel and one of a telephone, a facsimile module, and a modem;

deactivating said computer for user interaction on appropriate input from said user; and printing with a printer a billing statement, said printer being in communication with said computer.

7. The method in accordance with claim 6 further including before said deactivating step the step of comparing total activation time of said computer to a predetermined time and deactivating said computer without interaction from said user if said predetermined time is exceeded.

8. The method in accordance with claim 6 wherein said main program executing step includes:

displaying user choices on said monitor equipped with a touch screen;

monitoring the location of a user touch on said touch screen to determine user selection; and executing a subroutine program associated with said selection.

9. The method in accordance with claim 8 wherein said subroutine program executing step includes selecting among touch locations, identifying airline destination cities, selecting among touch locations identifying airline departure cities, selecting among touch locations identifying departure months, selecting among touch locations to determine a day of the month selected, selecting among touch locations to determine a time of day, and displaying flight information for a predetermined time before and after the time selected.

10. The method in accordance with claim 9 wherein said subroutine program executing step includes a simultaneous step during said selecting steps of initiating a telephone connection with a flight information service and, after said flight information service telephone connection is made and said flight information is displayed, calling an airline to allow said user to make a reservation.

* * * * *

UNITED STATES PATENT AND TRADEMARK OFFICE
CERTIFICATE OF CORRECTION

PATENT NO. : 5,393,964

DATED : Feb. 28, 1995

INVENTOR(S) : Hamilton et al.

It is certified that error appears in the above-identified patent and that said Letters Patent is hereby corrected as shown below:

Column 7, line 66, "O" should read --_O--.

Column 8, lines 1, 2 and 3, "O" should read --_O--.

Column 8, line 5, "N" should read --_N--.

Signed and Sealed this

Twenty-sixth Day of September, 1995

Attest:

BRUCE LEHMAN

*Attesting Officer*              *Commissioner of Patents and Trademarks*